(12) United States Patent
Du et al.

(10) Patent No.: US 10,169,295 B2
(45) Date of Patent: Jan. 1, 2019

(54) CONVOLUTION OPERATION DEVICE AND METHOD

(71) Applicant: Kneron, Inc., San Diego, CA (US)

(72) Inventors: Li Du, La Jolla, CA (US); Yuan Du, Los Angeles, CA (US); Yi-Lei Li, San Diego, CA (US); Yen-Cheng Kuan, San Diego, CA (US); Chun-Chen Liu, San Diego, CA (US)

(73) Assignee: KNERON, INC., San Diego, CA (US)

( * ) Notice: Subject to any disclaimer, the term of this patent is extended or adjusted under 35 U.S.C. 154(b) by 0 days.

(21) Appl. No.: 15/459,737

(22) Filed: Mar. 15, 2017

(65) Prior Publication Data

US 2018/0137084 A1  May 17, 2018

(30) Foreign Application Priority Data

Nov. 14, 2016  (CN) .......................... 2016 1 1002219

(51) Int. Cl.
| | |
|---|---|
| *G06F 17/15* | (2006.01) |
| *G06F 7/544* | (2006.01) |
| *G06N 3/00* | (2006.01) |
| *G06F 7/50* | (2006.01) |
| *G06T 1/20* | (2006.01) |

(52) U.S. Cl.
CPC .............. *G06F 17/153* (2013.01); *G06F 7/50* (2013.01); *G06F 7/5443* (2013.01); *G06N 3/00* (2013.01); *G06T 1/20* (2013.01)

(58) Field of Classification Search
CPC .......... G06T 1/20; G06F 17/15–17/153; G06F 7/5443; G06F 17/16
USPC .................................................. 708/315, 420
See application file for complete search history.

(56) References Cited

U.S. PATENT DOCUMENTS

| | | | | |
|---|---|---|---|---|
| 4,907,182 | A * | 3/1990 | Giuliano ............. | G06F 15/8046 708/420 |
| 7,013,319 | B1 * | 3/2006 | Gentile .............. | H03H 17/0223 708/315 |
| 9,858,636 | B1 * | 1/2018 | Lim ..................... | G06F 17/153 |
| 2011/0029471 | A1 | 2/2011 | Chakradhar et al. | |
| 2016/0379073 | A1 * | 12/2016 | Pan ..................... | G06K 9/00986 382/279 |
| 2018/0137407 | A1 * | 5/2018 | Du ....................... | G06N 3/0454 |
| 2018/0137414 | A1 * | 5/2018 | Du ....................... | G06N 3/063 |

* cited by examiner

*Primary Examiner* — Matthew D Sandifer
(74) *Attorney, Agent, or Firm* — Muncy, Geissler, Olds & Lowe, P.C.

(57) ABSTRACT

A convolution operation method includes the following steps of: performing convolution operations for data inputted in channels, respectively, so as to output a plurality of convolution results; and alternately summing the convolution results of the channels in order so as to output a sum result. A convolution operation device executing the convolution operation method is also disclosed.

21 Claims, 8 Drawing Sheets

CONVOLUTION OPERATION DEVICE AND METHOD

CROSS REFERENCE TO RELATED APPLICATIONS

This Non-provisional application claims priority under 35 U.S.C. § 119(a) on Patent Application No(s). 201611002219.0 filed in People's Republic of China on Nov. 14, 2016, the entire contents of which are hereby incorporated by reference.

BACKGROUND OF THE INVENTION

Field of Invention

The present invention relates to a convolution operation device and method utilizing an interleaving summing architecture.

Related Art

Convolutional neural network (CNN) is generally applied in the image processing device for performing the image process with the image data. In general, the common sliding window used in the convolution operations is 1×1, 3×3, 5×5 or 7×7, and the 3×3 sliding window is the most commonly used scale. Thus, the convolution units in the convolution operation device are usually designed in the 3×3 scale. In the following example, the maximum input bandwidth is 8 pixel data. When eight 3×3 convolution units perform 1×1 convolution operations for 8 pixel data, only one adder in each 3×3 convolution unit is substantially executes the convolution operation, and the other adders are not operated. This is a waste of the hardware resource.

Therefore, it is an important subject to provide a convolution operation device and method that can enhance the utilization of the components of the convolution unit, thereby improving the performance of convolution operation.

SUMMARY OF THE INVENTION

An objective of the present invention is to provide a convolution operation device and method that can enhance the utilization of the components of the convolution unit, thereby improving the performance of convolution operation.

To achieve the above objective, the present invention discloses a convolution operation device, which includes a plurality of convolution operation modules and an interleaving sum unit. Each of the convolution operation modules has a plurality of convolution units, and each of the convolution units is configured to output a plurality of convolution results. The interleaving sum unit is coupled to the convolution units of the convolution operation modules and configured to sum the convolution results of the convolution operation modules by interleaving so as to output sum results.

In one embodiment, the convolution units and the interleaving sum unit are optionally operated in a low-scale convolution mode or a high-scale convolution mode. In the low-scale convolution mode, each of the convolution units is configured to output the convolution results, and the interleaving sum unit is configured to sum the convolution results of the convolution operation modules by interleaving so as to output sum results. In the high-scale convolution mode, each of the convolution units is configured to output a plurality of high-scale convolution results, and the interleaving sum unit outputs the high-scale convolution results.

In one embodiment, each of the convolution units includes a plurality of low-scale convolution outputs performing low-scale convolution operations for outputting the convolution results, and a high-scale convolution output performing high-scale convolution operations for outputting high-scale convolution results.

In one embodiment, the interleaving sum unit optionally outputs one of the sum results and the high-scale convolution results.

In one embodiment, the convolution operation modules are coupled to the channels, respectively, and a total width of the channels is equal to that of the sum results.

In one embodiment, an amount of the convolution operation modules is less than or equal to that of the convolution units in each of the convolution operation modules.

In one embodiment, the convolution results of each of the convolution units are results of convolution operations in the same scale.

In one embodiment, an amount of the convolution operation modules is equal to that of the convolution results of each of the convolution units.

To achieve the above objective, the present invention also discloses a convolution operation method, including the following steps of: performing convolution operations for data inputted in channels, respectively, so as to output a plurality of convolution results; and summing the convolution results of the channels by interleaving so as to output sum results.

In one embodiment, the convolution operation method further includes the following steps of: determining to perform the convolution operations in a low-scale convolution mode or a high-scale convolution mode; when in the low-scale convolution mode, performing high-scale convolution operations so as to output a plurality of high-scale convolution results, and taking the high-scale convolution results as an output; and when in the high-scale convolution mode, performing low-scale convolution operations with the data inputted in the channels so as to output the convolution results, and summing the convolution results of the channels by interleaving so as to output the sum results.

In one embodiment, the convolution operation method further includes a step of: optionally outputting one of the sum results and the high-scale convolution results.

In one embodiment, a total width of the channels is equal to that of the sum results.

In one embodiment, the convolution results of each of the convolution units are results of convolution operations in the same scale.

In one embodiment, the step of summing the convolution results by interleaving is a partial operation of a consecutive layer of a convolutional neural network.

In one embodiment, the partial operation crosses the channels.

As mentioned above, the convolution operation device and method of the invention can perform the convolution operations for the data inputted to the convolution operation modules simultaneously, and the interleaving sum unit is configured to sum the convolution results of the convolution operation modules by interleaving so as to output sum results. Accordingly, the total width of the new data inputted in the channels is equal to that of the sum results, thereby enhance the utilization of the convolution units and making the input bandwidth to be equal to the output bandwidth.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
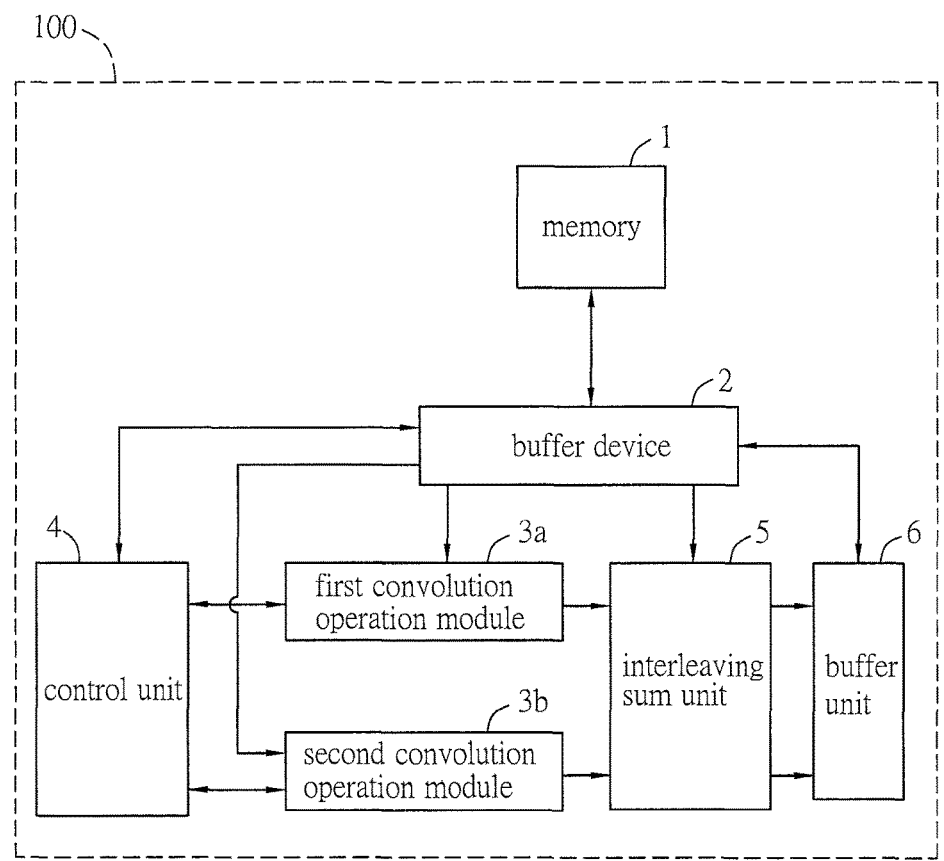
FIG. 1 is a block diagram of a convolution operation device according to an embodiment of the invention.

FIG. 1 is a block diagram of a convolution operation device according to an embodiment of the invention. In the following embodiment, the convolution operation device includes two convolution operation modules for example. Referring to FIG. 1, the convolution operation device 100 includes a memory 1, a buffer device 2, a first convolution operation module 3a, a second convolution operation module 3b, a control unit 4, a buffer unit 6, and an interleaving sum unit 5. The convolution operation module 3a has a plurality of convolution units 30a-37a, and the convolution operation module 3b has a plurality of convolution units 30b-37b. The interleaving sum unit 5 is coupled to the convolution units of the convolution operation modules 3a and 3b.

The convolution operation device 100 can be applied to the convolution operations in the convolutional neural network. The memory 1 stores the data for the convolution operations. The data include, for example, image data, video data, audio data, statistics data, or the data of any layer of the convolutional neural network. The image data may contain the pixel data. The video data may contain the pixel data or movement vectors of the frames of the video, or the audio data of the video. The data of any layer of the convolutional neural network are usually 2D array data, and these data are usually the image data. All or most data can be stored in an additional device, such as another memory, and all or a part of these data are loaded into the memory 1 when executing the convolution operation. Then, the buffer device 2 inputs the data into the convolution operation modules 3a and 3b for executing the convolution operations. If the inputted data are from the data stream, the latest data of the data stream are written into the memory 1 for the convolution operations.

The control unit 4 may include an instruction decoder and a controller. The instruction decoder receives an instruction from the controller, and then decodes the instruction for obtaining the data size, columns and rows of the inputted data, the number of the sliding window (or convolution size), and the initial address of the inputted data in the memory 1. In addition, the instruction decoder can also obtain the type of the sliding window and the outputted characteristics number from the controller, and output the proper control signal to the buffer device 2. The buffer device 2 can operate according to these signals as well as controlling the operations of the first convolution operation module 3a, the second convolution operation module 3b, the interleaving sum unit 5 and the buffer unit 6. For example, the obtained information may include the clock for inputting the data from the memory 1 to the buffer device 2, the clock for inputting the data from the memory 1 to the first convolution operation module 3a and the second convolution operation module 3b, the scales of the convolution operations of the first convolution operation module 3a and the second convolution operation module 3b, the reading address of the data in the memory 1 to be outputted to the buffer device 2, the writing address of the data into the memory 1 from the buffer unit 6, and the convolution modes of the first convolution operation module 3a and the second convolution operation module 3b.

For example, each convolution operation module includes a plurality of convolution units, and each convolution unit executes a convolution operation based on a filter and a plurality of current data. After the convolution operation, a part of the current data is remained for the next convolution operation. The buffer device 2 retrieves a plurality of new data from the memory 1, and the new data are inputted to the convolution units. The new data are not duplicated with the current data. For example, the new data are not counted in the previous convolution operation, but are used in the current convolution operation. The convolution unit of the convolution operation module can execute a next convolution operation based on the filter, the remained part of the current data, and the new data.

The convolution operation modules can be parallel operated for enhancing the performance, and the multiple data retrieved from the memory through multiple channels can be processed by different modules. For example, each channel may include, for example but not limited to, 8 data, and each data represents the value of one pixel. The data in different channels can be applied to corresponding modules for convolution operations. For example, the data in the first channel is inputted to the first convolution operation module 3a, and the data in the second channel is inputted to the second convolution operation module 3b. In addition, if there are more channels, such as i channels, it is possible to add additional convolution operations modules, such as a third convolution operations module to an ith convolution operations module, for correspondingly performing convolution operations with the data in the third to ith channel.

In one aspect, the convolution operation device 100 is, for example, a processor, and the memory 1 is a cache memory within the processor. The buffer device 2 includes a plurality of functional units for improving the performance of the parallel processes of the convolution operations. The functional units of the convolution units 30a~37a and 30b~30b, the control unit 4, the interleaving sum unit 5, the buffer unit 5 and the buffer device 2 are made of digital logical circuits, and each of the above units may include a plurality of logical elements for performing the desired function. Besides, the memory 1, the buffer device 2, the first convolution operation module 3a, the second convolution operation module 3b, the control unit 4, the interleaving sum unit 5 and the buffer unit 6 can be integrated in a single IC.

In another aspect, the memory 1 can be a random access memory (RAM), and the first convolution operation module 3a, the second convolution operation module 3b, the control unit 4, the interleaving sum unit 5 and the buffer unit 6 can be integrated in a single IC. In addition, if there are more convolution operation modules, these convolution operation modules can be integrated within the same IC as the above-mentioned units and modules.

In addition, the first convolution operation module 3a, the second convolution operation module 3b and the interleaving sum unit 5 can be controlled by the control unit 4 and thus optionally operated in a low-scale convolution mode or a high-scale convolution mode. The high-scale convolution mode is a 3×3 convolution operation mode, and the low-scale convolution mode is a 1×1 convolution operation mode. In the low-scale convolution mode, the interleaving sum unit 5 can sum the convolution results of the first convolution operation module 3a and the second convolution operation module 3b by interleaving so as to output sum results corresponding the channels. In the high-scale convolution mode, the interleaving sum unit 5 outputs the high-scale convolution results.

For example, the control unit 4 can receive a control signal or a mode instruction, and then select one of the convolution modes for the other modules and units according to the received control signal or mode instruction. The control signal or mode instruction can be outputted from another control unit or processing unit.

Figure 2:
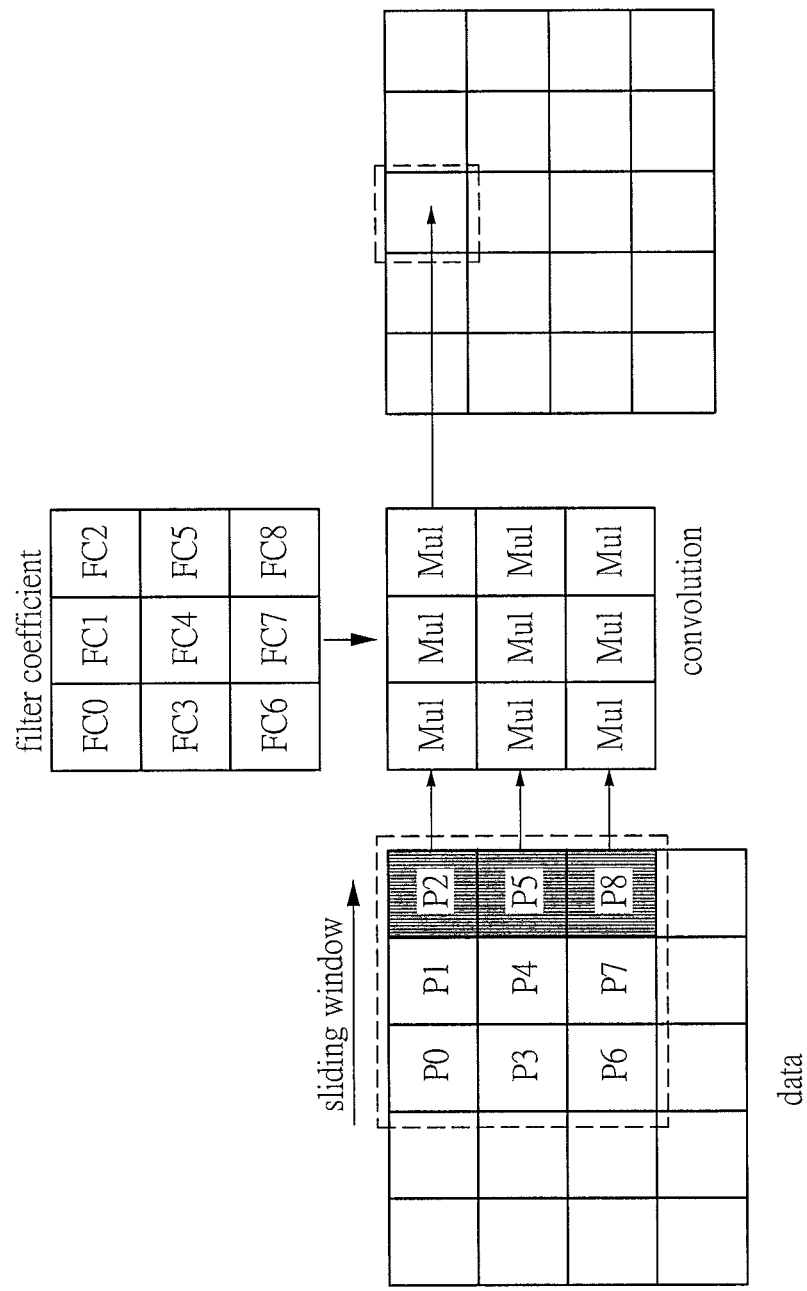
FIG. 2 is a schematic diagram showing the convolution operation device of FIG. 1 performing a convolution operation with a 2D data.

FIG. 2 is a schematic diagram showing the convolution operation device of FIG. 1 performing a convolution operation with a 2D data. The 2D data has multiple columns and multiple rows, and the 2D data can be an image data such as 5×4 pixels. As shown in FIG. 2, a filter of a 3×3 array can be used in the convolution operation for 2D data. The filter has the coefficients of FC0~FC8, and the stride of the filter is smaller than the shortest width of the filter. The size of the filter matches the sliding window or convolution operation window. The sliding window can move on the 5×4 image. In each movement, a 3×3 convolution operation is executed regarding to the data P0~P8 corresponding to the window. The result of the convolution operation is named as a characteristics value. The moving distance of the sliding window S is a stride. The size of the stride is smaller than the size of the sliding window or the convolution size. In this embodiment, the stride of the sliding window is smaller than the distance of three pixels. In general, the adjacent convolution operations usually have overlapped data. If the stride is 1, the data P2, P5 and P8 are the new data, and the data P0, P1, P3, P4, P6 and P7 have been inputted in the previous convolution operation. In the convolutional neural network, the common size of the sliding window can be 1×1, 3×3, 5×5, 7×7, or the likes. In this embodiment, the size of the sliding window is 3×3.

Figure 3:
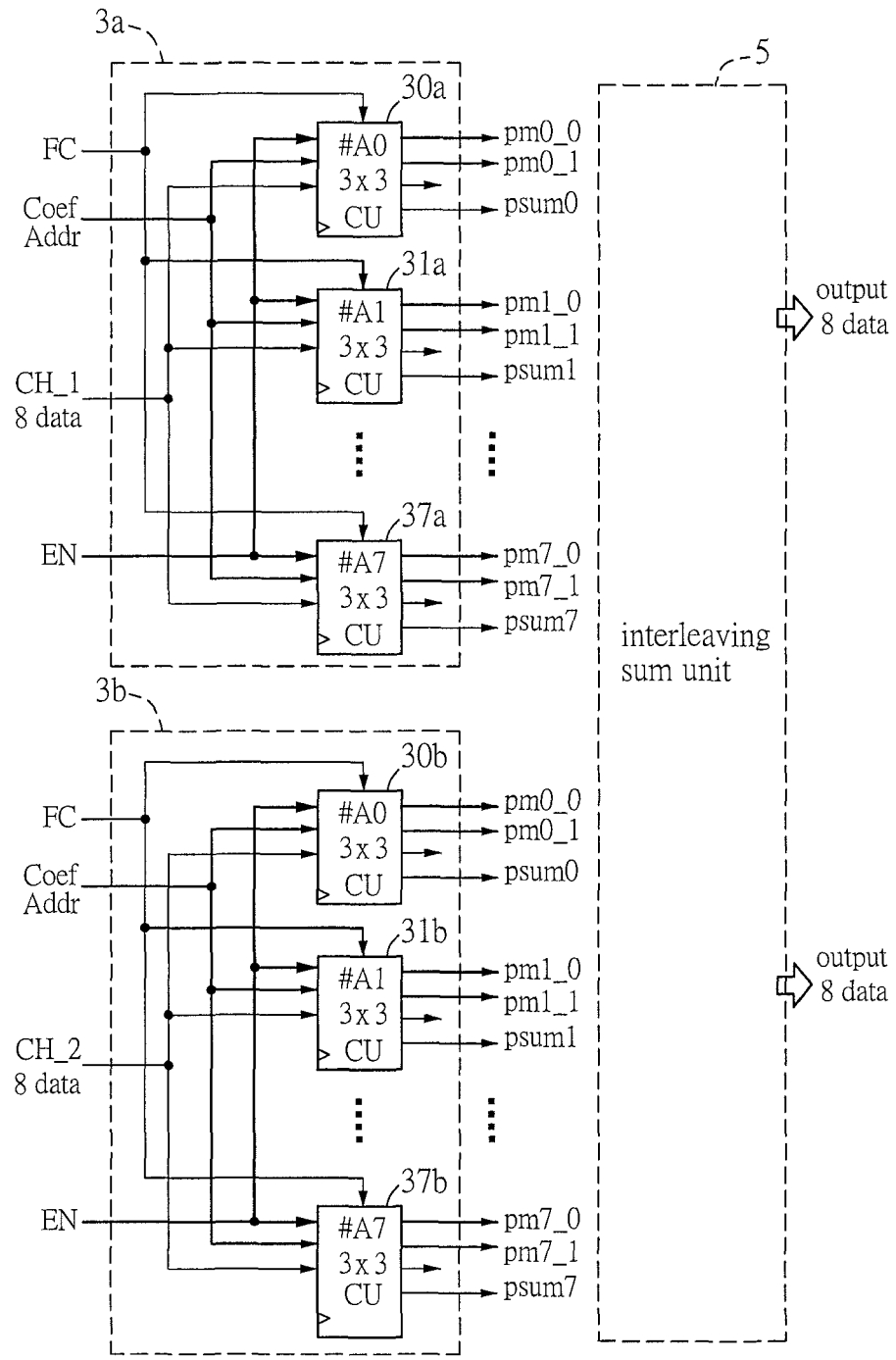
FIG. 3 is a schematic diagram showing the architecture of the convolution operation module of an embodiment of the invention performing the convolution operation.

FIG. 3 is a schematic diagram showing the architecture of the convolution operation module of an embodiment of the invention performing the convolution operation. As shown in FIG. 3, the first convolution operation module 3a includes convolution units 30a~37a, and the second convolution operation module 3b includes convolution units 30b~37b.

Each of the convolution units 30a~37a and 30b~37b may include a data input, a filter coefficient input, a coefficient address input, an enable input, a plurality of low-scale convolution outputs, and a high-scale convolution output.

Taking the first convolution operation module 3a as an example, the filter coefficients for convolution operations are inputted to the convolution units 30a-37a through a filter circuit FC. The filter circuit FC can be a bus. The coefficient reading addresses of the filter circuit FC are inputted to the convolution units 30a~37a through the address line Coef Addr. The convolution units 30a~37a can read the filter coefficients from the filter circuit FC according to the coefficient reading addresses. Based on the current convolution operation mode, the new data of the first channel CH_1 can be inputted to the corresponding convolution units 30a~37a. The enable control signal is inputted to the convolution units 30a~37a through the control line EN. The enable control signal can individually enable the convolution units 30a~37a, and further enable the internal elements of the convolution units 30a~37a. According to the current convolution operation mode, each of the convolution units 30a~37a can perform a convolution operation based on the data inputted from the first channel CH_1 and the filter coefficient and output the result. In the low-scale convolution mode, each of the convolution units 30a~37a can output two low-scale convolution results, so the total output includes the low-scale convolution results pm0_0~pm7_0 and pm0_1~pm7_1. In the high-scale convolution mode, each of the convolution units 30a~37a can output one high-scale convolution result, so the total output includes the high-scale convolution results psum0~psum7. For example, when the low-scale convolution mode is a 1×1 convolution operation, of the convolution unit 30a performs a 1×1 convolution operation and outputs two low-scale convolution results pm0_0 and pm0_1. When the high-scale convolution mode is a 3×3 convolution operation, the convolution unit 30a performs a 3×3 convolution operation and outputs one high-scale convolution result psum0. The other convolution units 31a~37a have similar outputs.

Since the stride of the 3×3 convolution operation is 1, there are 6 data are the same as the data processed in the previous convolution operation after moving the window of filter for once. Accordingly, the amount of the actually needed new data is 3. In addition, each of the convolution units 30a~37a has three inputted data, and every three inputted data of each of the convolution units 30a~37a are shifted by one data. In other words, two adjacent convolution units have two inputted data in common. Actually, all convolution units 30a~37a need 10 inputted data. Since the first two of the 10 inputted data have been read in the previous convolution operation, a buffer can buffer two data. Accordingly, the inputted new data through the channels in each convolution operation are still 8.

In addition, the filters of channels can be the same or different. The convolution operation module 3b and more convolution operation modules have the same operation and architecture as the above-mentioned.

The interleaving sum unit 5 is also controlled by the control unit 4 so as to optionally operate in one of the convolution operation modes. The interleaving sum unit 5 is configured to output the sum results or the high-scale convolution results corresponding to the convolution operation mode.

The interleaving sum unit 5 is coupled to the first convolution operation module 3a and the second convolution operation module 3b. The first convolution operation module 3a and the second convolution operation module 3b can execute operations based on the characteristics of the inputted data and then output the characteristics operation results. When the data with multiple characteristics are inputted, the first convolution operation module 3a and the second convolution operation module 3b can correspondingly output a plurality of operation results. The interleaving sum unit 5 can combine the operation results of the convolution operation modules 3a and 3b and then output an output characteristics result. After receiving the output characteristics result, the interleaving sum unit 5 sends the output characteristics result to the buffer unit 6 for the next processing.

For example, the convolutional neural network has a plurality of operation layers, such as the convolutional layer and pooling layer. The convolutional neural network may have a plurality of convolutional layers and pooling layers, and the output of any of the above layers can be the input of another one of the above layers or any consecutive layer. For example, the output of the N convolutional layer is the input of the N pooling layer or any consecutive layer, the output of the N pooling layer is the input of the N+1 convolutional layer or any consecutive layer, and the output of the N operational layer is the input of the N+1 operational layer.

In order to enhance the operation performance, when performing the operation of the Nth layer, a part of the operation of N+i layer will be executed depending on the situation of the operation resource (hardware). Herein, i is greater than 0, and N and i are natural numbers. This configuration can effectively utilize the operation resource and decrease the operation amount in the operation of the N+i layer.

In this embodiment, when executing an operation (e.g. a 3×3 convolution operation), the first convolution operation module 3a and the second convolution operation module 3b perform the operations for one convolutional layer of the convolutional neural network. The interleaving sum unit 5 doesn't execute a part of the operation of a consecutive layer in the convolutional neural network, and the buffer unit 6 executes an operation for the pooling layer of the same level in the convolutional neural network. When executing another operation (e.g. a 1×1 convolution operation), the first convolution operation module 3a and the second convolution operation module 3b perform the operations for one convolutional layer of the convolutional neural network. The interleaving sum unit 5 executes a part of the operation (e.g. a sum operation) of a consecutive layer in the convolutional neural network, and the buffer unit 6 executes an operation for the pooling layer of the same level in the convolutional neural network. In other embodiments, the buffer unit 6 can execute not only the operation of the pooling layer, but also a part of the operation of a consecutive layer in the convolutional neural network. Herein, a part of the operation can be a sum operation, an average operation, a maximum value operation, or other operations of a consecutive layer, and it can be executed in the current layer of the convolutional neural network.

The convolution operation methods applied with a high-scale convolution mode and a low-scale convolution mode will be described hereinafter with reference to FIGS. 4A and 4C. Herein, the high-scale convolution mode is a 3×3 convolution operation mode, and the low-scale convolution mode is a 1×1 convolution operation mode.

Figure 4A:
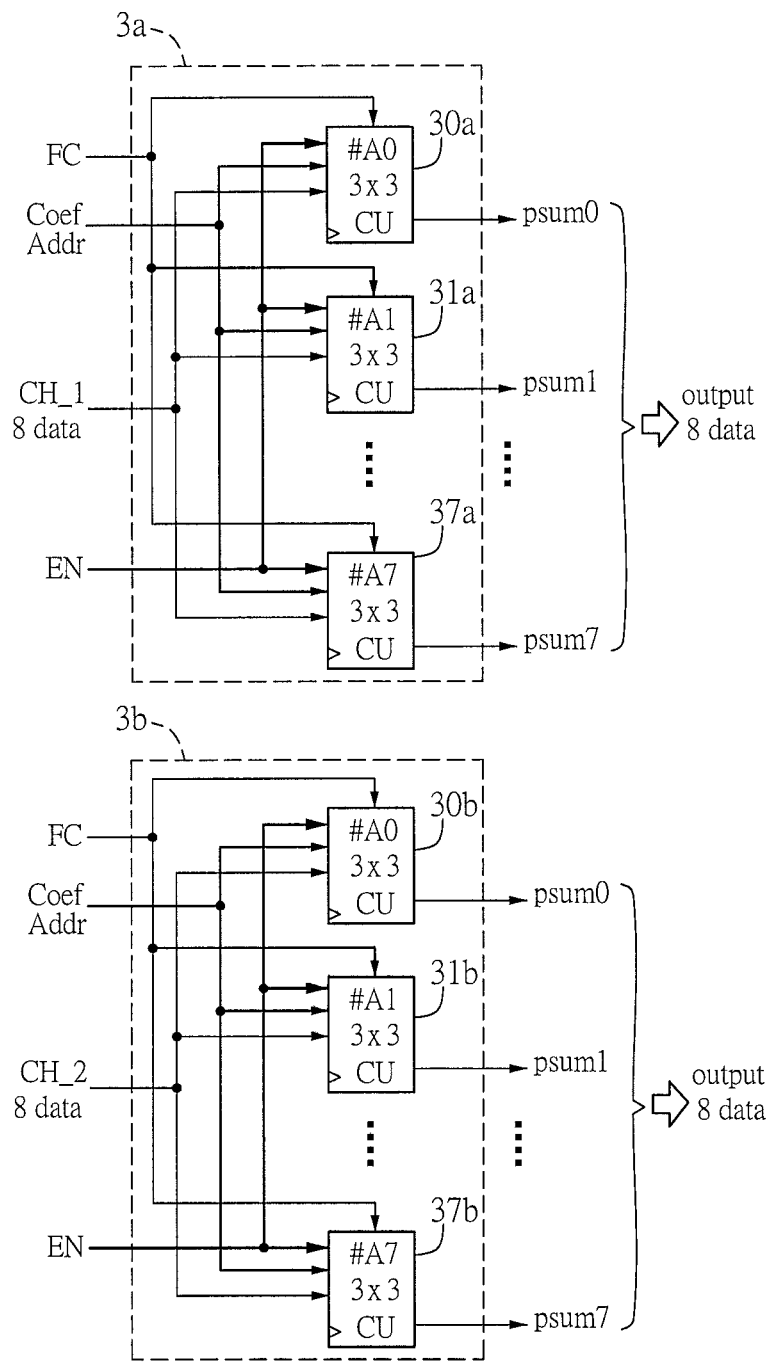
FIG. 4A is a schematic diagram showing the convolution operation module of FIG. 3 operated in a 3×3 convolution operation mode.

FIG. 4A is a schematic diagram showing the convolution operation module of FIG. 3 operated in a 3×3 convolution operation mode.

Referring to FIG. 4A, 8 new data are inputted to the first channel CH_1, and 8 new data are inputted to the second channel CH_3. 3×3 filter coefficients are inputted to the convolution units 30a~37a and 30b~37b through the filter circuit FC. The convolution units 30a~37a execute 3×3 convolution operations according to the filter coefficients and inputted data, and then output the convolution results psum0~psum7. The convolution units 30b~37b execute 3×3 convolution operations according to the filter coefficients and inputted data, and then output the convolution results psum0~psum7. Accordingly, the first convolution operation module 3a and the second convolution operation module 3b totally output 16 data. The total input bandwidth of the first convolution operation module 3a and the second convolution operation module 3b is equal to the total output bandwidth thereof. The interleaving sum unit 5 does not perform the sum operation by interleaving but utilizing the convolution results psum0~psum7 as its output.

Figure 4B:
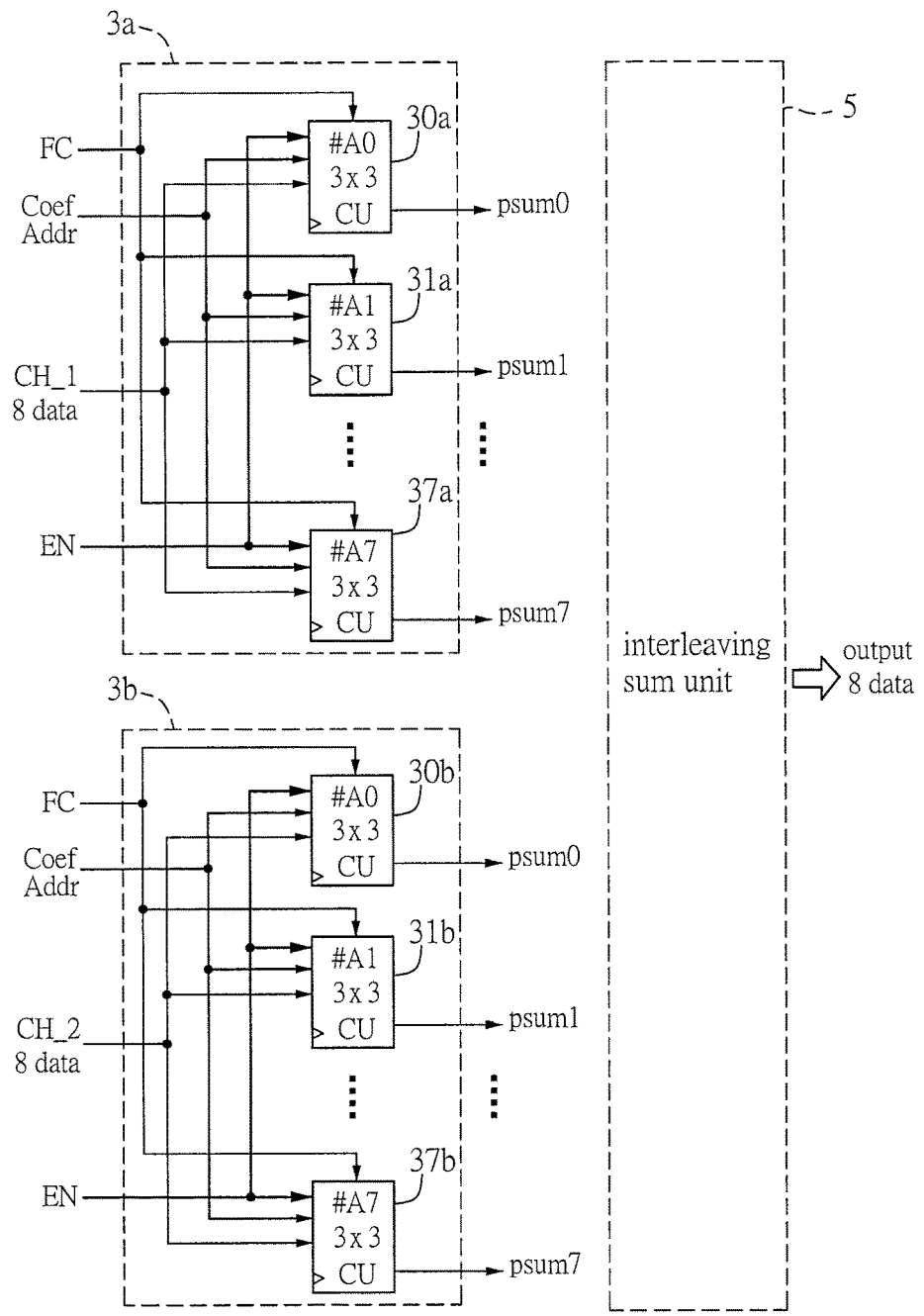
FIG. 4B is a schematic diagram showing another aspect of the convolution operation module of FIG. 3 operated in a 3×3 convolution operation mode.

In addition, the interleaving sum unit 5 can perform the sum operation by interleaving with the output results of the first convolution operation module 3a and the second convolution operation module 3b. FIG. 4B is a schematic diagram showing another aspect of the convolution operation module of FIG. 3 operated in a 3×3 convolution operation mode. In this aspect, the first convolution operation module 3a and the second convolution operation module 3b output the results of different channels, respectively, and the interleaving sum unit 5 performs the sum operation by interleaving with the output results thereof. For example, the convolution results psum0~psum7 outputted by the first convolution operation module 3a are added with the convolution results psum~psum7 outputted by the second convolution operation module 3b one by one (by interleaving), thereby finally outputting 8 interleaved results. In this operation, the first convolution operation module 3a and the second convolution operation module 3b perform the operation for one convolution layer of the convolutional neural network, and the interleaving sum unit 5 performs a part of the operation for a consecutive layer of the convolutional neural network.

Figure 4C:
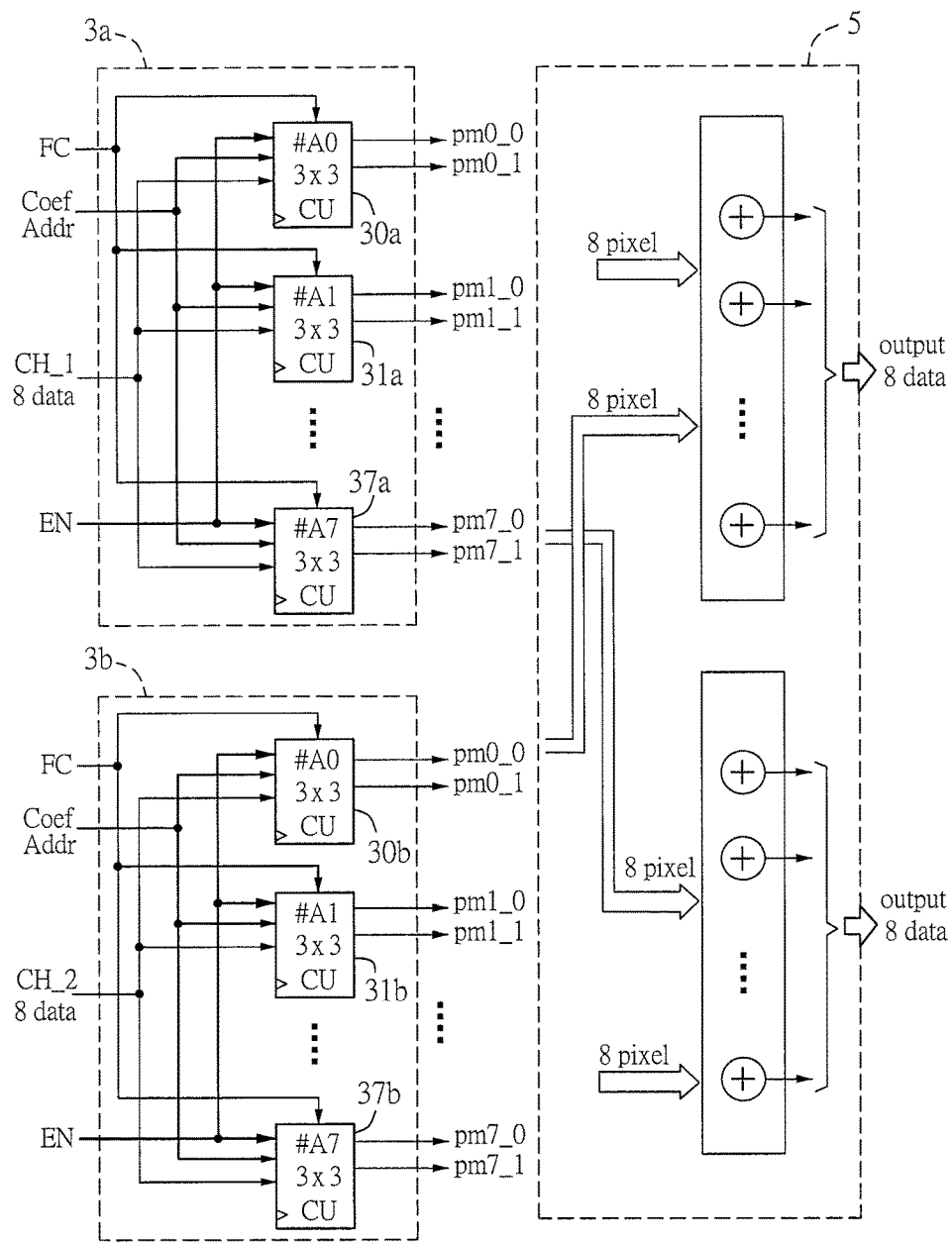
FIG. 4C is a schematic diagram showing the convolution operation module of FIG. 3 operated in a 1×1 convolution operation mode.

FIG. 4C is a schematic diagram showing the convolution operation module of FIG. 3 operated in a 1×1 convolution operation mode. As shown in FIG. 4C, 8 new data are inputted to the first channel CH_1, and 8 new data are inputted to the second channel CH_3. Two 1×1 filter coefficients are inputted to the convolution units 30a~37a and 30b~37b through the filter circuit FC. Since one 1×1 filter only has one coefficient, the two 1×1 filter coefficients can be inputted through the input circuit configured for the 3×3 filter coefficients. Taking the first convolution operation module 3a as an example, the convolution units 30a~37a execute convolution operations according to the inputted data and the two 1×1 filter coefficients, and then output the 16 convolution results pm0_~pm7_0 and pm0_1~pm7_1. Accordingly, the first convolution operation module 3a and the second convolution operation module 3b totally output 32 convolution results. Then, the interleaving sum unit 5 adds the convolution results pm0_0~pm7_0 outputted by the first convolution operation module 3a with the convolution results pm0_0~pm7_0 outputted by the second convolution operation module 3b one by one (by interleaving), thereby outputting 8 data of partially add operations. In this operation, the first convolution operation module 3a and the second convolution operation module 3b perform the operation for one convolution layer of the convolutional neural network, and the interleaving sum unit 5 performs a part of the operation for a consecutive layer of the convolutional neural network.

In other words, the interleaving sum unit 5 can sum the corresponding 1×1 convolution results of the convolution operation modules 3*a* and 3*b* by interleaving and then output the sum results. For example, the convolution results pm0_0 of the convolution operation modules 3*a* and 3*b* are added, and the sum result is used as an output of the interleaving sum unit 5. The residual 7 sum results can be obtained based on the above operation. As a result, the interleaving sum unit 5 can sum the convolution results of the first convolution operation module 3*a* and the second convolution operation module 3*b* by interleaving, and then output the sum results, respectively. Accordingly, the total width of the sum results of the first convolution operation module 3*a* and the second convolution operation module 3*b* is equal to the total width of the new inputted data from the first channel CH_1 and the second channel CH_2. Although the number of the 1×1 convolution results is twice of the number of the 3×3 convolution results, it is still unnecessary to design additional output lines or bandwidth.

Figure 5:
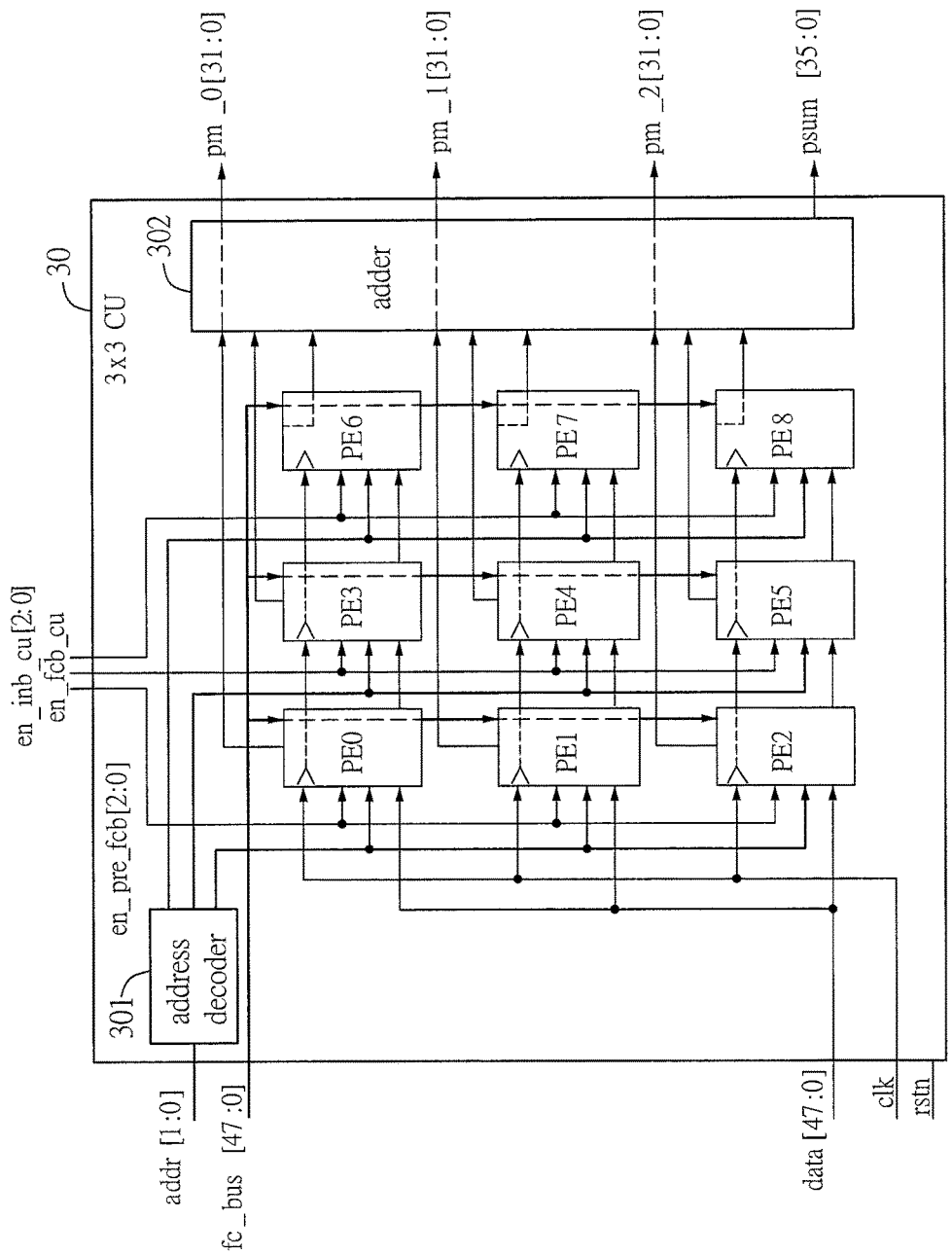
FIG. 5 is a block diagram of a convolution unit according to an embodiment of the invention.

FIG. 5 is a block diagram of a convolution unit according to an embodiment of the invention. As shown in FIG. 5, the convolution unit 30 includes 9 processing engines PE0~PE8, an address decoder 301, and an adder 302. The convolution unit 30 can be applied to any of the convolution units 30*a*~37*a* and 30*b*~37*b* of FIGS. 3, 4A and 4C.

In a 3×3 convolution operation mode, the inputted data for the convolution operation are inputted to the process engines PE0~PE2 through the line data[47:0]. The process engines PE0~PE2 input the inputted data of the current clock to the process engines PE3~PE5 in the next clock for next convolution operation. The process engines PE3~PE5 input the inputted data of the current clock to the process engines PE6~PE8 in the next clock for next convolution operation. The 3×3 filter coefficient can be inputted to the process engines PE0~PE8 through the line fc_bus[47:0]. If the stride is 1, 3 new data can be inputted to the process engines, and 6 old data are shifted to other process engines. When executing the convolution operation, the process engines PE0~PE8 execute multiplications of the inputted data, which are inputted to the PE0~PE8, and the filter coefficients of the addresses selected by the address decoder 301. When the convolution unit 30 executes a 3×3 convolution operation, the adder 302 obtain a sum of the results of multiplications, which is the output psum [35:0].

When the convolution unit 30 performs a 1×1 convolution operation, the inputted data for the convolution operation are inputted to the process engines PE0~PE2 through the line data[47:0]. Three 1×1 filter coefficients are inputted to the process engines PE0~PE2 through the line fc_bus[47:0]. If the stride is 1, 3 new data can be inputted to the process engines. When executing the convolution operation, the process engines PE0~PE2 execute multiplications of the inputted data, which are inputted to the PE0~PE2, and the filter coefficients of the addresses selected by the address decoder 301. When the convolution unit 30 executes a 1×1 convolution operation, the adder 302 directly uses the results of the convolution operations of the process engines PE0~PE2 as the outputs pm_0 [31:0], pm_1 [31:0], and pm_2 [31:0]. In addition, since the residual process engines PE3~PE8 don't perform the convolution operations, they can be temporarily turned off for saving power. Although the outputs of the convolution units 30 include three 1×1 convolution operations, it is possible to select two of the convolution units 30 to couple to the interleaving sum unit. Alternatively, three convolution units 30 can be coupled to the interleaving sum unit, and the number of the 1×1 convolution operation results to be outputted to the interleaving sum unit can be determined by controlling the ON/OFF of the process engines PE0~PE2.

Figure 6:
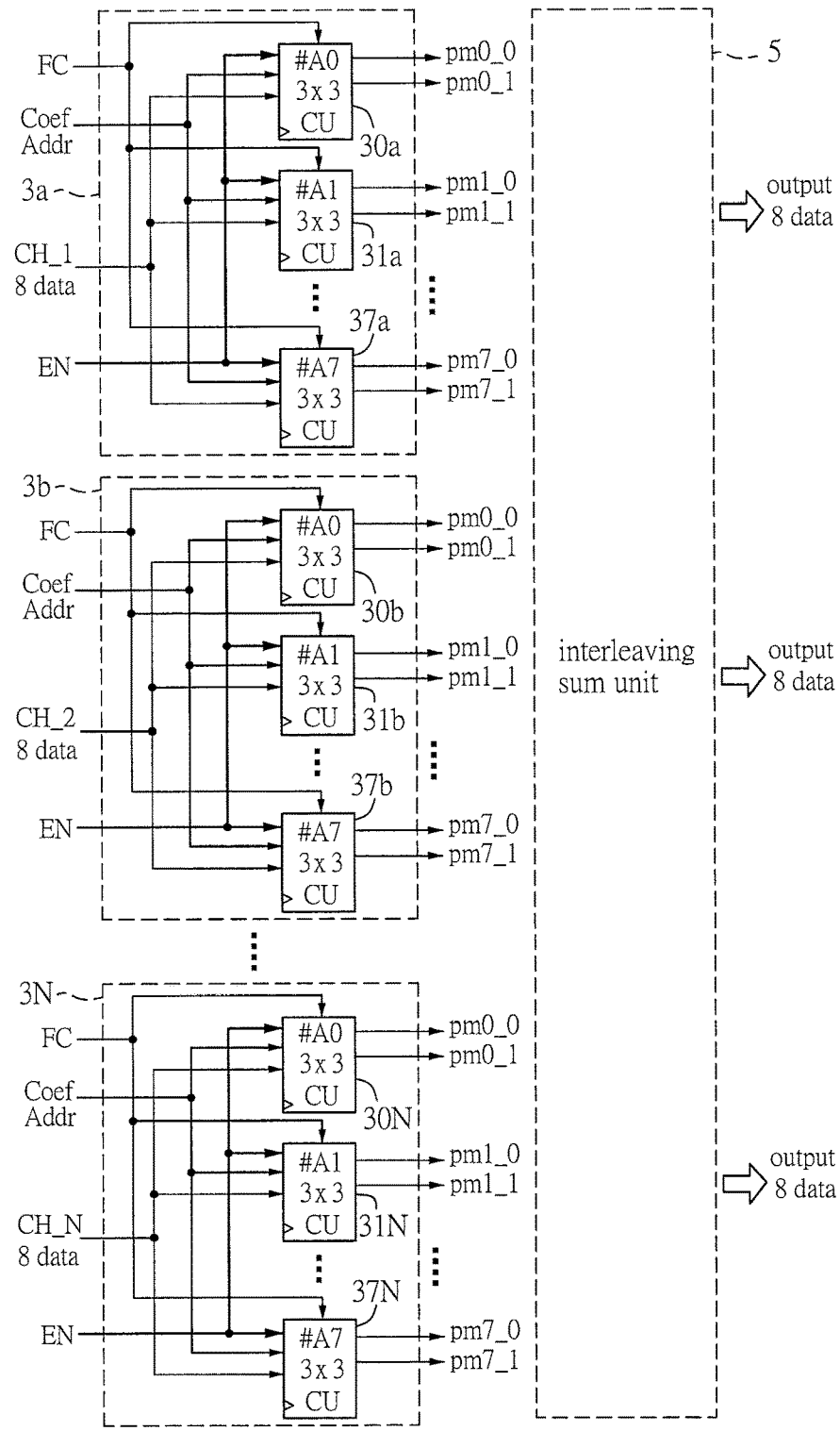
FIG. 6 is a schematic diagram showing a convolution operation module according to another embodiment of the invention operated in a 1×1 convolution operation mode.

As mentioned above, the convolution operation device and method of the invention can simultaneously perform multiple 1×1 convolution operations by two or more convolution operation modules, thereby enhancing the performance of convolution operation. FIG. 6 is a schematic diagram showing a convolution operation module according to another embodiment of the invention operated in a 1×1 convolution operation mode. Referring to FIG. 6, in the 1×1 convolution operation mode, 8 data are inputted to each of a plurality of channels, including the first channel CH_1 to the Nth channel CH_N. Each of the convolution units 30*a*~37*a*, . . . and 30N-37N can select a corresponding filter coefficient and perform a 1×1 convolution operation. The interleaving sum unit 5 sums the convolution results outputted by the convolution units 30*a*~37*a*, . . . and 30N~37N according to the relationship between the filter coefficients and the channels CH_1~CH_N, thereby obtaining N*8 sum results. In addition, the number of the convolution operation modules is limited by the memory bandwidth and the number of process engines PE in a single convolution unit. For example, if the convolution operation module uses 3×3 convolution units for convolution operations, there are mostly 9 convolution operation modules can be used for 1×1 convolution operations simultaneously.

The output of the interleaving sum unit 5 can be divided into N channels, and the number of the outputted data of each channel is equal to the number of the input data of the channel.

In the first channel, the first output data is a sum of the 1×1 convolution results pm0_0 of the convolution units 30*a*~30N of the convolution operation module 3*a*~3N. The second output data is a sum of the 1×1 convolution results pm1_0 of the convolution units 30*a*~30N of the convolution operation module 3*a*~3N, and so on. The Nth output data is a sum of the 1×1 convolution results pmN_0 of the convolution units 30*a*~30N of the convolution operation module 3*a*~3N.

In the second channel, the first output data is a sum of the 1×1 convolution results pm0_1 of the convolution units 30*a*~30N of the convolution operation module 3*a*~3N. The second output data is a sum of the 1×1 convolution results pm1_1 of the convolution units 30*a*~30N of the convolution operation module 3*a*~3N, and so on. The Nth output data is a sum of the 1×1 convolution results pmN_1 of the convolution units 30*a*~30N of the convolution operation module 3*a*~3N.

Similarly, in the Nth channel, the first output data is a sum of the 1×1 convolution results pm0_N of the convolution units 30*a*~30N of the convolution operation module 3*a*~3N. The second output data is a sum of the 1×1 convolution results pm1_N of the convolution units 30*a*~30N of the convolution operation module 3*a*~3N, and so on. The Nth output data is a sum of the 1×1 convolution results pmN_N of the convolution units 30*a*~30N of the convolution operation module 3*a*~3N.

The convolution operation method can be applied to the convolution operation device in the previous embodiment, and the modifications and application details will be omitted here. The convolution operation method can also be applied to other computing devices. For example, the convolution operation method for a data stream can be performed in a processor that can execute instructions. The instructions for performing the convolution operation method are stored in the memory. The processor is coupled to the memory for executing the instructions so as to performing the convolution operation method. For example, the processor includes a cache memory, a mathematical operation unit, and an internal register. The cache memory is configured for storing the data stream, and the mathematical operation unit is configured for executing the convolution operation. The internal register can remain a part data of the current convolution operation in the convolution operation module, which are provided for the next convolution operation.

In summary, the convolution operation device and method of the invention can perform the convolution operations for the data inputted to the convolution operation modules simultaneously, and the interleaving sum unit is configured to sum the convolution results of the convolution operation modules by interleaving so as to output sum results. Accordingly, the total width of the new data inputted in the channels is equal to that of the sum results, thereby enhance the utilization of the convolution units and making the input bandwidth to be equal to the output bandwidth.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A convolution operation device, comprising:
   a plurality of convolution operation modules, wherein each of the convolution operation modules has a plurality of convolution units, and each of the convolution units is configured to output a plurality of convolution results; and
   an interleaving sum unit coupled to the convolution units of the convolution operation modules and configured to sum the convolution results of the convolution operation modules by interleaving so as to output sum results,
   wherein the convolution units and the interleaving sum unit are optionally operated in a low-scale convolution mode or a high-scale convolution mode;
   wherein, in the low-scale convolution mode, each of the convolution units is configured to output the convolution results, and the interleaving sum unit is configured to sum the convolution results of the convolution operation modules by interleaving so as to output sum results; and
   wherein, in the high-scale convolution mode, each of the convolution units is configured to output a plurality of high-scale convolution results, and the interleaving sum unit outputs the high-scale convolution results.

2. The convolution operation device of claim 1, wherein each of the convolution units comprises:
   a plurality of low-scale convolution outputs performing low-scale convolution operations for outputting the convolution results; and
   a high-scale convolution output performing high-scale convolution operations for outputting high-scale convolution results.

3. The convolution operation device of claim 2, wherein the interleaving sum unit optionally outputs one of the sum results and the high-scale convolution results.

4. The convolution operation device of claim 1, wherein the convolution operation modules are coupled to channels, respectively, and a total width of the channels is equal to that of the sum results.

5. The convolution operation device of claim 1, wherein an amount of the convolution operation modules is less than or equal to that of the convolution units in each of the convolution operation modules.

6. The convolution operation device of claim 1, wherein the convolution results of each of the convolution units are results of convolution operations in the same scale.

7. The convolution operation device of claim 6, wherein an amount of the convolution operation modules is equal to that of the convolution results of each of the convolution units.

8. A convolution operation device, comprising:
   a plurality of convolution operation modules, wherein each of the convolution operation modules has a plurality of convolution units, and each of the convolution units is configured to output a plurality of convolution results; and
   an interleaving sum unit coupled to the convolution units of the convolution operation modules and configured to sum the convolution results of the convolution operation modules by interleaving so as to output sum results,
   wherein each of the convolution units comprises:
   a plurality of low-scale convolution outputs performing low-scale convolution operations for outputting the convolution results; and
   a high-scale convolution output performing high-scale convolution operations for outputting high-scale convolution results.

9. The convolution operation device of claim 8, wherein the interleaving sum unit optionally outputs one of the sum results and the high-scale convolution results.

10. The convolution operation device of claim 8, wherein the convolution operation modules are coupled to channels, respectively, and a total width of the channels is equal to that of the sum results.

11. The convolution operation device of claim 8, wherein an amount of the convolution operation modules is less than or equal to that of the convolution units in each of the convolution operation modules.

12. The convolution operation device of claim 8, wherein the convolution results of each of the convolution units are results of convolution operations in the same scale.

13. The convolution operation device of claim 12, wherein an amount of the convolution operation modules is equal to that of the convolution results of each of the convolution units.

14. A convolution operation device, comprising:
    a plurality of convolution operation modules, wherein each of the convolution operation modules has a plurality of convolution units, and each of the convolution units is configured to output a plurality of convolution results; and
    an interleaving sum unit coupled to the convolution units of the convolution operation modules and configured to sum the convolution results of the convolution operation modules by interleaving so as to output sum results,
    wherein the convolution results of each of the convolution units are results of convolution operations in the same scale, an amount of the convolution operation modules is equal to that of the convolution results of each of the convolution units.

15. The convolution operation device of claim 14, wherein the interleaving sum unit optionally outputs one of the sum results and the high-scale convolution results.

16. The convolution operation device of claim 14, wherein the convolution operation modules are coupled to channels, respectively, and a total width of the channels is equal to that of the sum results.

17. The convolution operation device of claim 14, wherein an amount of the convolution operation modules is less than or equal to that of the convolution units in each of the convolution operation modules.

18. A convolution operation device, comprising:
   a plurality of convolution operation modules, wherein each of the convolution operation modules has a plurality of convolution units, and each of the convolution units is configured to output a plurality of convolution results; and
   an interleaving sum unit coupled to the convolution units of the convolution operation modules and configured to sum the convolution results of the convolution operation modules by interleaving so as to output sum results,
   wherein the convolution operation modules are coupled to channels, respectively, and a total width of the channels is equal to that of the sum results.

19. The convolution operation device of claim 18, wherein each of the convolution units comprises:
   a plurality of low-scale convolution outputs performing low-scale convolution operations for outputting the convolution results; and
   a high-scale convolution output performing high-scale convolution operations for outputting high-scale convolution results,
   wherein the interleaving sum unit optionally outputs one of the sum results and the high-scale convolution results.

20. The convolution operation device of claim 18, wherein an amount of the convolution operation modules is less than or equal to that of the convolution units in each of the convolution operation modules.

21. The convolution operation device of claim 18, wherein the convolution results of each of the convolution units are results of convolution operations in the same scale.

* * * * *